INVENTOR
R. H. KALLENBERGER
BY Young and Quigg
ATTORNEYS

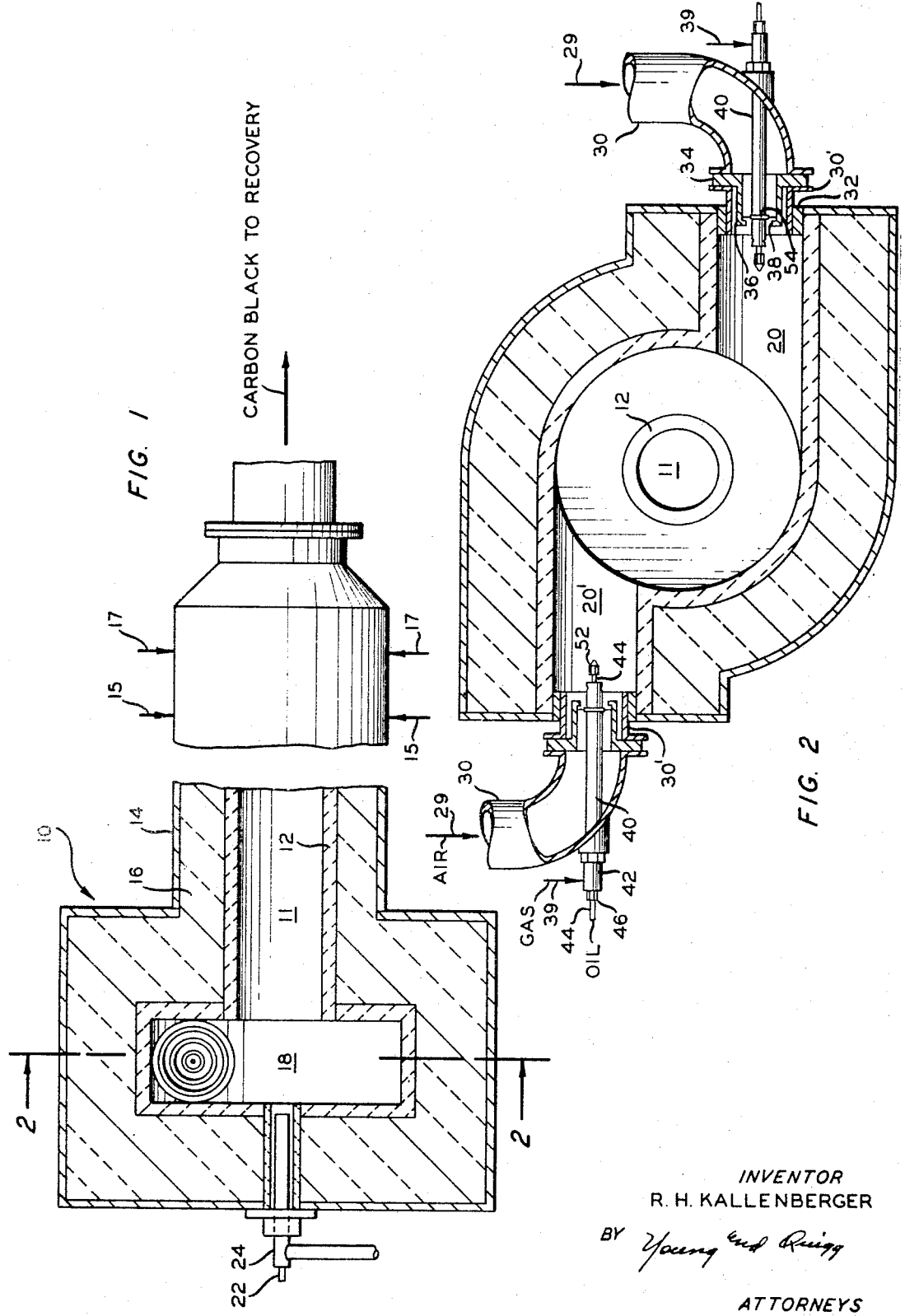

United States Patent Office 3,445,190
Patented May 20, 1969

3,445,190
METHOD FOR PRODUCING CARBON BLACK
Robert H. Kallenberger, Phillips, Tex., assignor to Phillips Petroleum Company, a corporation of Delaware
Filed Dec. 20, 1965, Ser. No. 515,140
Int. Cl. C09c 1/50
U.S. Cl. 23—209.4
7 Claims

ABSTRACT OF THE DISCLOSURE

Method and apparatus for producing carbon black wherein the structure characteristics of the carbon black product are controlled by controlling the amount of hydrocarbon feedstock introduced into (1) a first combustion zone downstream from hot combustion gases produced therein and (2) a second combustion zone with which said first combustion zone communicates.

---

This invention relates to a method and an apparatus for producing carbon black.

For several years carbon black has been produced in large quantities in furnaces. One particularly outstanding successful furnace process is that disclosed and claimed in U.S. Patent 2,564,700 (1951). In one embodiment the process of said patent utilizes a reactor comprising a precombustion zone positioned coaxially with and in open communication with a reaction zone of smaller diameter than that of the precombustion zone. A fuel and a free oxygen-containing gas in combustible proportions are introduced, at a high velocity, into a tunnel in which combustion takes place. Combustion is substantially completed in the tunnel and the resulting products then pass tangentially into the precombustion zone. In this zone the hot gases spiral inward until the spiral is smaller in diameter than the reaction zone. The hot gases then follow a generally helical path into the reaction zone. A reactant capable of being converted to carbon black is introduced axially into the precombustion zone and is reacted in the reaction zone by heat directly imparted thereto by the gases of combustion. The present invention is an improvement on said process of said Patent 2,564,700.

The larger part of the carbon black produced today is used as a reinforcing agent for rubber. By far the larger part of the compounded rubber material containing carbon black is designed specifically for tire treads or tire carcasses. The state of the rubber compounding art has advanced to such a degree that the properties of the carbon black used in such compounding must be controlled within narrow limits. Such a control of all of the desired properties of the carbon black is oftentimes difficult to achieve.

One of the most important properties of a carbon black when used in the compounding of rubber for use in tire manufacturing is commonly referred to as "structure." There is a good correlation between the structure of a carbon black and the modulus of a rubber product compounded with said carbon black. Other properties being comparable, high structure carbon blacks normally yield high modulus rubber and low structure carbon blacks normally yield low modulus rubber.

By the term "structure," as applied herein to carbon black, is meant characteristics of the carbon black particles which relate to flocculation of said particles. The structure is said to be high when there is a strong tendency for the particles to form chains of particles. Conversely, the structure is said to be low when there is little tendency to form such chains. While the classifications are all relative, the carbon blacks of commerce can be classified generally as "high structure," "normal structure," and "low structure."

Furnace carbon blacks having high structure characteristics have several advantages in the compounding of rubber. For example, they are "easy processing," i.e., are readily compounded into the rubber. Another advantage is that rubber compounded with high structure carbon blacks possesses superior extrusion properties. For many of the applications where high structure furnace blacks are preferred, it would be desirable to have carbon blacks of higher structure than can normally be produced by furnace processes.

Recently, furnace carbon blacks having relatively low structure for blacks made by a furnace process have been prepared by incorporating certain additives into the hydrocarbon feedstock prior to its introduction into the carbon black-forming zone. These blacks have, in some instances, proved to be useful in applications formerly served by channel blacks, for example, in reinforcing natural rubber products and in specific applications, for example, in nonsqueal, soft-riding tires. These blacks are often designated "low structure" furnace blacks even though their structure values or oil absorption values fall in the range for blacks generally designated as "normal" structure or in the range between "normal" and "high" structure because their oil absorption values are lower than normal for blacks made by a furnace process. Thus, for several applications it is desirable to be able to provide furnace carbon blacks having a relatively low structure for a carbon black made by a furnace process.

Thus, it would be desirable to have a furnace carbon black process wherein the structure of the carbon black product can be controlled and/or varied to meet market demands. The present invention provides such a process. In the practice of this invention in accordance with one embodiment thereof there is produced, from a given hydrocarbon feedstock, a furnace carbon black product characterized by increased or higher structure characteristics, i.e., structure characteristics which are higher than what would normally be expected from a furnace carbon black produced from said feedstock. In accordance with another embodiment of the invention, there is produced, from a given feedstock, a carbon black product characterized by decreased or lower structure characteristics, i.e., said carbon black product is characterized by structure properties which are lower than what would normally be expected from a furnace carbon black produced from said feedstock.

An object of this invention is to provide valuable carbon blacks and methods of making same. Another object of this invention is to provide a process for the production of furnace carbon blacks wherein the structure characteristics of the carbon black product can be controlled. Another object of this invention is to provide a process for making a furnace carbon black, from a given hydrocarbon feedstock, having higher structure characteristics than the carbon black which normally would be produced from said hydrocarbon feedstock. Another object of this invention is to provide a process for making a furnace carbon black, from a given hydrocarbon feedstock, having lower structure characteristics than the carbon black which normally would be produced from said hydrocarbon feedstock. Another object of this invention is to provide a furnace carbon black process wherein the properties of the carbon black product can be regulated and controlled so as to satisfy prescribed and predetermined requirements. Another object of this invention is to provide an improved apparatus for the production of carbon black. Other aspects, objects, and advantages of the invention will be apparent to those skilled in the art in view of this disclosure.

Thus, according to the invention, there is provided a process for the production of a furnace carbon black product wherein: a fuel and a free oxygen-containing gas are introduced into at least one first combustion zone which communicates tangentially with a second generally cylindrical combustion zone having a diameter greater than its length; said fuel is substantially completely burned in said first zone and the resulting combustion mixture is passed into said second zone to establish a rotating mass of hot combustion gases therein; said combustion gases spiral inwardly toward the longitudinal axis of said second zone and while so rotating pass into an axially aligned third zone having a length greater than its diameter and a diameter less than the diameter of said second zone whereby a helical movement of said combustion gases is established along the inner wall of said third zone; a hydrocarbon feedstock stream is passed through said second zone along said axis thereof and axially into said third zone; said carbon black product is formed in said second and third zones by the decomposition of said feedstock; and said carbon black product is recovered from the gaseous effluent from said third zone, the improvement comprising: introducing at least a portion of said feedstock into said first zone downstream from the point of introduction of said fuel and free oxygen-containing gas and passing same along with said combustion mixture into said second zone and into admixture with said rotating mass of hot combustion gases; and controlling the structure characteristics of said carbon black product by controlling the amount of said thus introduced portion of feedstock.

It will be noted that in the practice of this invention at least a portion of the hydrocarbon feedstock or reactant from which carbon black is to be produced is introduced into a first combustion zone which communicates tangentially with a second combustion zone. Said second combustion zone has been referred to in the prior art as a precombustion zone. Said first combustion zone is an inlet tunnel communicating tangentially with said precombustion zone and into which is the prior art only fuel and a free oxygen-containing gas are introduced. In the practice of the invention, the amount of hydrocarbon feedstock introduced into said first combustion zone will generally be an amount within the range of from 10 to 100 volume percent of the total hydrocarbon feedstock charged to the furnace. If an increase in the structure characteristics of the carbon black product is desired, it will usually be necessary to introduce at least about 30, preferably about 35, volume percent of the hydrocarbon feedstock into said first zone. The introduction of 100 volume percent of the hydrocarbon feedstock into said first zone yields a carbon black product having higher structure characteristics than the carbon black produced when only a portion of the hydrocarbon feedstock is introduced into said first combustion zone. In a reactor wherein two of said first combustion zones which communicate tangentially with said second combustion zone are provided, e.g., on opposite sides of said second combustion zone, the hydrocarbon feedstock can be introduced into said two combustion zones in equal amounts. However, I have found that the greatest increase in structure is obtained when all of the hydrocarbon feedstock is introduced into said two first combustion zones in unequal amounts, i.e., a major portion in one of said first combustion zones and a minor portion in the other of said first combustion zones.

FIGURE 1 is a diagrammatic illustration, partly in cross section, of one type of carbon black furnace which can be employed in the practice of the invention.

FIGURE 2 is a cross section taken along the lines 2—2 of FIGURE 1.

Figure 4:
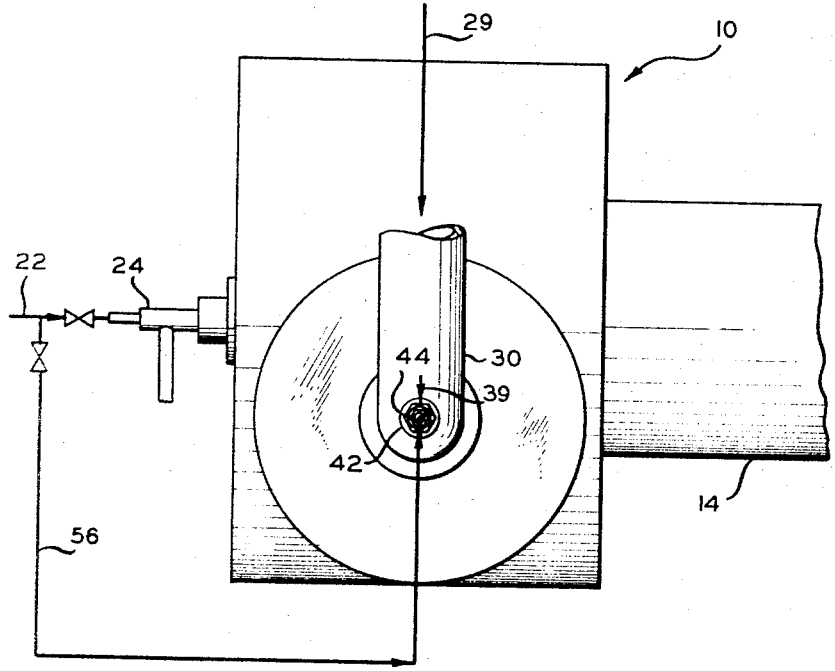
FIGURE 4 is a flow diagram which further illustrates the invention.

Referring now to the drawings, wherein like reference numerals have been employed to denote like elements, the invention will be more fully explained. FIGURE 1 illustrates in diagrammatic form the general structure and general shape of one presently preferred type of carbon black furnace, designated generally by the reference numeral 10, which can be employed in the practice of the invention. In FIGURE 1 there is shown a reaction section 11 having a refractory lining 12 made of highly refractory material such as sillimanite, alumina, or other refractory material suitable for the purpose. A steel shell 14 containing insulating material 16 surrounds said refractory liner 12. At the inlet end of the furnace there is a short section 18 having a diameter larger than its length and considerably larger than the diameter of reaction section 10. Said larger diameter section 18 is essentially a combustion chamber wherein the burning of a combustible mixture of a fuel, such as natural gas, and a free oxygen-containing gas, such as air, is completed. The fuel used in forming said combustible mixture can be any suitable fuel, either liquid, solid, or gaseous. Generally speaking, gaseous fuel such as natural gas is preferred. Liquid hydrocarbon oils are the next most preferred fuel. The free oxygen-containing gas is usually air but can be essentially pure oxygen or other gases diluted with essentially pure oxygen.

In the operation of said furnace in accordance with the prior art, said combustible mixture is introduced by means of a conventional burner (not shown) into at least one tunnel inlet tube 20 or 20' which is so positioned with respect to combustion chamber 18 that gases formed in said tunnel 20 or 20' enter said combustion chamber 18 in a direction tangential to the cylindrical wall thereof. Any suitable means can be employed for introducing the combustible mixture into inlet tunnel 20 or 20', e.g., that shown in U.S. Patent 2,780,529. As discussed hereinafter, the burner and hydrocarbon feedstock inlet assembly illustrated in FIGURES 1 and 2 is not a part of the prior art. Burning of said combustible mixture is initiated and substantially completed in inlet 20 and/or 20'. Any portion of said mixture which is not burned in said tunnel 20 and/or 20' is burned along the periphery of combustion chamber 18. Upon continued injection of combustible mixture into inlet tunnel 20 and/or 20', the resulting combustion mixture (flame and combustion products) exiting therefrom enters combustion chamber 18 and follows a spiral path around same toward the axis of said combustion chamber 18. When the spiral becomes less than the diameter of reaction section 11, the gaseous flow changes from a spiral to a helical form, and following this latter pattern enters said reaction section 11. A reactant hydrocarbon oil, from a source not shown, is usually passed through a preheater, also not shown, and finally passes through said conduit 22 which is arranged axially so that the feed hydrocarbon introduced therethrough will be introduced along the axis of said combustion chamber 18, pass therethrough, and enter the center of said reaction section 11. Formation of carbon black is initiated in chamber 18, completed in reaction section 11, and passes therefrom suspended in combustion gases to carbon black recovery equipment (not shown). However, before leaving reaction section 11 the reaction mixture (smoke) is quickly cooled to a temperature below that at which carbon black formation takes place. This cooling is effected in known manner by means of water introduced via conduits 15 or 17 which are here shown diagrammatically but which extend to the interior of reaction section 11 in known manner. Said formation of carbon black occurs through a pyrolytic decomposition and/or partial burning of the hydrocarbon feedstock under the carbon black-producing conditions which exist in said chamber 18 and reaction section 11.

Surrounding said feed conduit 22 is a larger conduit 24, called an "air jacket" in the prior art. A small amount of air is passed through the annular space between conduits 22 and 24. This air is not essential. Only sufficient air is used to prevent carbon deposition on the outlet of conduit 22 and/or to protect said conduits from the high temperature in chamber 18.

It is not essential that the downstream end portion of reaction section 11 have a constant diameter as illustrated. If desired, the downstream end portion of said reaction section can be provided with an enlarged diameter so as to provide increased residence time under carbon black-producing conditions without unduly increasing the length of said reaction section. For example, the upstream portion of reaction section 10 can have an inner diameter of 12 inches and any suitable length, e.g., up to 10 or 11 feet and the downstream portion of said reaction section can have an inner diameter of 18 inches and any suitable length, e.g., up to 10 or 11 feet. Since one foot of the 18-inch I.D. portion equals 2.25 feet of the 12-inch portion, insofar as volume is concerned, it is clear how the overall length can be varied. The combustion chamber 18 can be 12 inches in length and have a diameter of 37 inches. The above dimensions are not critical, are merely given as an example, and any and all dimensions can be varied in the practice of the invention. However, when employing a precombustion type of furnace as illustrated in FIGURE 1, the combustion chamber 18 should have a larger diameter than the reaction section 11. Further details regarding the structure and operation of said furnace can be found in said Patent 2,564,700.

Figure 3:
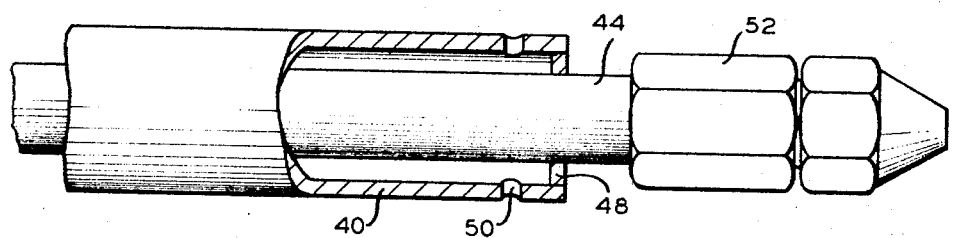
FIGURE 3 is a view, partly in cross section, illustrating a detail of the apparatus of FIGURE 2.

Referring now to FIGURES 2 and 3, there is shown in detail one form of burner and hydrocarbon feedstock inlet assembly in accordance with the invention and which can be employed in the practice of this invention. It will be understood that while said furnace is illustrated as being provided with two tangential inlets or tunnels 20 and 20', it is within the scope of the invention for said furnace to be provided with only one such tangential inlet or tunnel. Said tangential tunnels 20 and 20' are oppositely disposed with respect to each other and each communicates tangentially with combustion chamber 18 at opposite areas on the periphery thereof. Positioned within each of said tunnels 20 and 20' is a burner and hydrocarbon feedstock inlet assembly in accordance with the invention. As here illustrated, said assembly comprises an air inlet or outer conduit which is here illustrated as being formed of two sections 30 and 30'. Disposed between the outer wall of said section 30' and the wall of tunnel 20 is a sleeve 32, here shown as being made of metal but which in some instances can be preferably formed from a ceramic material. As shown, the outlet end of said outer conduit 30, 30' extends into tunnel 20, and the inlet end of said outer conduit is connected to a source of air supply. A flange bushing 34, having a sleeve 36 attached to the downstream face thereof, is disposed between said sections 30 and 30' of said outer conduit. An orifice 38 is formed on the downstream end of said sleeve 36.

A first inner conduit 40 is positioned longitudinally within said outer conduit for at least a portion of its length and the outlet end of said inner conduit 40 extends beyond the outlet end of said outer conduit, i.e., section 30'. As here shown, the inlet end of said first inner conduit 40 extends through a wall of section 30 of said outer conduit and through a packing gland assembly 42 which provides means for slidably moving said first inner conduit 40 and thus change the position of its outlet end within tunnel 20.

A second inner conduit 44 is positioned longitudinally within said first inner conduit 40 with its outlet end extending beyond the outlet end of said first inner conduit 40. A second packing gland means 46 is mounted on the inlet end portion of said first inner conduit 40 and the inlet end of said second inner conduit 44 extends therethrough to provide means for slidably moving said second inner conduit 44 and thus change the position of its outlet end within tunnel 20 and with respect to the outlet end of said first inner conduit 40.

The outlet end of said first inner conduit 40 is closed by a closure means 48 (see FIGURE 3), here shown to be a washer or annular member positioned at the end of said first inner conduit 40 and between same and the outer wall of said second inner conduit 44. Any suitable means can be provided for closing the outlet or downstream end of said first inner conduit 40. A plurality of radially disposed openings 50 are provided circumferentially around the downstream end portion of said first inner conduit 40 adjacent said closure means 48. A nozzle means 52 is disposed on the outlet end of said second inner conduit 44. Any suitable nozzle means can be employed in the practice of the invention. Said first inner conduit 40 is supported within sleeve 36 by means of a loosely fitting collar 54 which is supported from the inner wall of sleeve 36 by the plurality of rods shown or any other suitable means.

In the practice of this invention, a free oxygen-containing gas, such as air, is passed from conduit 29 through at least one outer conduit 30, 30' and a fuel, such as natural gas, is passed from conduit 39 through at least one first inner conduit 40 and openings 50 in the downstream end thereof into the stream of air flowing through at least one sleeve 36. The resulting mixture is ignited and the flame is a turbulent, nonlaminar flame which is anchored in the turbulent zone produced by the orifice 38 and/or the step produced by the end of sleeve 32. Combustion is complete, or substantially so, before the burning combustion mixture leaves tunnel 20 and/or 20' and enters combustion zone 18. At least a portion of the hydrocarbon feedstock from conduit 22 is passed via conduit 56 (see FIGURE 4) and into at least one second inner conduit 44, and is introduced into tunnel 20 and/or 20', by means of spray nozzle 52, at a point downstream from the entrance of said air and said fuel gas. It is within the scope of the invention for the outlet ends of said second inner conduits 44 to be an open end tube. When such an open-ended tube is employed the hydrocarbon feedstock should be substantially in gas or vapor state. It is preferred to employ a spray nozzle means 52 so as to more effectively introduce the hydrocarbon feedstock as a cone-shaped discharge into the burning mixture of fuel gas and air in said tunnel 20 and/or 20'. The thus introduced hydrocarbon feedstock is passed along with said combustion mixture into said second combustion zone 18 and into admixture with the rotating mass of hot combustion gases therein. The resulting admixture then enters reaction section 10 in a generally helical flow as previously described.

At present it is not known for certain whether or not any carbon black is actually formed in said first combustion zone (tunnels 20 and/or 20'). However, while it is not intended to limit the invention by any theories as to reaction mechanisms, it is presently believed that formation of the carbon black product is at least initiated, i.e., the first step or steps toward formation of said carbon black product occur in said first zone, formation of the carbon black product is probably at least carried forward in said second combustion zone 18, and is probably completed in said third zone (reaction section 11). Thus, in the overall process, said carbon black product is formed by pyrolytic decomposition and/or partial burning of the hydrocarbon feedstock under carbon black producing conditions in said first, second, and third zones.

As indicated above, the greatest increase in structure characteristics of the carbon block is obtained when all of the hydrocarbon feedstock is introduced into the two first combustion zones (tunnels 20 and 20') in unequal amounts. Thus, in one presently preferred embodiment of the invention, from about 7.5 to about 40, preferably from about 10 to about 20, volume percent of said feedstock can be introduced into one of said tunnels with the remainder being introduced into the other tunnel.

The following example will serve to further illustrate the invention. The test runs set forth in the example were carried out in a reactor embodying the essential features of the reactor illustrated in FIGURES 1 and 2. In the reactor employed, combustion section 18 was 37 inches in diameter and 12 inches in length. The reaction section 10 was 12 inches in diameter. Tunnels 20 and 20' were 12 inches in diameter and approximately 24 inches in length along the short side. The outlet of nozzle 52 was approximately 3¼ inches downstream from openings 50, and said openings 50 were approximately 2 inches downstream from orifice 38. The above dimensions are given by way of example only, are not limiting on the invention, and any and all can be varied within the scope of the invention. The charge oils utilized in the various runs had the properties set forth in Table I below.

TABLE I.—PROPERTIES OF FEEDSTOCKS

| Oil Number | A | B |
|---|---|---|
| API Gravity | 10.8 | 10.8 |
| ASTM Vacuum Distillation, °F. at 760 mm.: | | |
| 2% | [1] 460 | 559 |
| 5% | 563 | 583 |
| 10% | 595 | 597 |
| 20% | 623 | 616 |
| 30% | 648 | 643 |
| 40% | 668 | 660 |
| 50% | 690 | 678 |
| 60% | 712 | 696 |
| 70% | 751 | 721 |
| 80% | 795 | 753 |
| 90% | [2] 868 | 810 |
| 95% | | 856 |
| Bureau of Mines, Correlation Index | 90.5 | 91 |
| Carbon, Wt. Percent | 89.2 | 89.1 |
| Hydrogen, Wt. Percent | 9.5 | 9.4 |

[1] First Drop.
[2] 88%.

EXAMPLE

A series of runs was made utilizing aromatic concentrate oil B as the hydrocarbon feedstock. This oil had a BMCI value of 91. Said feedstock is a conventional commercial feedstock prepared by the liquid sulfur dioxide extraction of cycle oils obtained in the catalytic cracking of gas oils. Operating conditions, yields of carbon black, and tests on the carbon black products are set forth in Table II below. Another run, Run No. 1, was a control run made with aromatic concentrate oil A as the feedstock. In this control run, none of the hydrocarbon feedstock was introduced tangentially via the inlet tunnels 20 and 20′ and the combustible mixture of air and fuel gas supplied to said tunnels 20 was introduced by a conventional burner assembly similar to that illustrated in U.S. Patent 2,780,529.

introduced tangentially, the oil absorption value (structure) of the carbon black product was less than the oil absorption value (structure) of the carbon black product produced in control Run No. 1 wherein all of the feedstock was introduced axially via conduit 22. In Runs 4 and 5 where about 39 and about 35 volume percent, respectively, of the hydrocarbon feedstock was introduced tangentially, there was obtained a slight increase in the oil absorption value (structure) of the carbon black product as compared to the carbon black produced in control Run No. 1.

In Runs 7–10, inclusive, all of the hydrocarbon feedstock was introduced tangentially via tunnels 20 and 20′ as described herein but a portion of said thus introduced feedstock was introduced into top tunnel 20′ with the remainder being introduced via bottom tunnel 20. In these runs the split of the hydrocarbon feedstock between said tunnels 20 and 20′ was unequal, i.e., a major portion was introduced via one of said tunnels and a minor portion was introduced via the other of said tunnels. Comparing said Runs 7–10, inclusive, with Runs 2–6, inclusive, wherein all of the hydrocarbon feedstock was also introduced via said tunnels 20 and 20′ but was split evenly therebetween, shows that the highest structure carbon black product is obtained when all of the hydrocarbon feedstock is introduced via said tangential tunnels but when there is an uneven split between said tunnels.

The above-described aromatic concentrate oils of the example represent one presently preferred feedstock for use in the practice of the invention. However, conventional aromatic oils used in the production of furnace carbon blacks can include oils other than extract oils produced by liquid sulfur dioxide extraction of cycle oils. Typical properties of conventional aromatic oils are: boiling range, 400–1000° F.; BMCI, 75 to 150; and an API gravity of from about 0 to about 20°.

The invention is not to be limited to the use of aromatic concentrate oils. Other oils, such as kerosene, gasoline boiling range hydrocarbons, heavy or light naphthas or oils even heavier than recycle gas oils can be used. Such hydrocarbon materials as natural gas, either dry gas, wet

TABLE II

| | Run Number | | | | | | | | | |
|---|---|---|---|---|---|---|---|---|---|---|
| | 1* | 2 | 3 | 4 | 5 | 6 | 7 | 8 | 9 | 10 |
| Oil Charge: | | | | | | | | | | |
| Identification | A | B | B | B | B | B | B | B | B | B |
| BMCI | 91 | 91 | 91 | 91 | 91 | 91 | 91 | 91 | 91 | 91 |
| Total rate, gal./hr | 219.5 | 200.0 | 197.7 | 202.2 | 201.2 | 199.5 | 185.8 | 181 | 147 | 191.5 |
| Tangential rate, total gal./hr.: | 0 | 200.0 | 197.7 | 78.0 | 70.2 | 50.0 | 185.8 | 181 | 147 | 191.5 |
| Top tunnel 20′, gal./hr | 0 | 100.0 | 98.8 | 39.0 | 35.1 | 25.0 | 165.8 | 166 | 132 | 166.5 |
| Bottom tunnel 20, gal./hr | 0 | 100.0 | 98.9 | 39.0 | 35.1 | 25.0 | 20.0 | 15 | 15 | 25 |
| Axial rate, gal./hr | 219.5 | 0 | 0 | 124.2 | 131.0 | 149.5 | 0 | 0 | 0 | 0 |
| Preheat, tang. oil, °F | | 525 | 545 | 140 | 140 | 140 | 100 | 105 | 105 | 100 |
| Preheat, axial oil, °F | 560 | | | 770 | 770 | 770 | | | | |
| Furnace Conditions: | | | | | | | | | | |
| Tangential air, M c.f.h | 150 | 140 | 140 | 140 | 140 | 140 | 140 | 140 | 140 | 140 |
| Tangential gas, M c.f.h | 10.0 | 9.3 | 9.3 | 9.3 | 9.3 | 9.3 | 9.3 | 9.3 | 9.3 | 9.3 |
| Jacket air, M c.f.h | 4.0 | 4.0 | 4.0 | 4.0 | 4.0 | 4.0 | 0 | 0 | 0 | 0 |
| Carbon Black Product: | | | | | | | | | | |
| Yield, lb./gal | 3.87 | 3.96 | 3.50 | 4.08 | | | 4.04 | 4.10 | 3.41 | |
| Photolometer | 87 | 80 | | 79 | 95 | 93 | 88 | 91 | 96 | |
| N² Surface area, sq. m./g | 83.5 | 61.8 | 62.9 | 71.4 | 82.1 | 70.9 | 63.6 | 62.3 | 79.4 | |
| Oil absorption, cc./g | 1.32 | 1.41 | 1.42 | 1.35 | 1.36 | 1.21 | 1.50 | 1.47 | 1.47 | 1.51 |

*Control run.

Referring to Table II above, and particularly to Runs 1, 2 and 3, it will be noted that in Runs 2 and 3 where all of the hydrocarbon feedstock was introduced tangentially via the inlet tunnels 20 and 20′, the carbon black product had a greater oil absorption value (higher structural characteristics) than the carbon black product from Run No. 1 wherein all of the hydrocarbon feedstock was introduced axially via conduit 22 in conventional manner.

In Runs 4, 5, and 6 a portion of the hydrocarbon feedstock was introduced tangentially via inlet tunnels 20 and 20′ and the remainder was introduced axially via conduit 22 in conventional manner. In Run No. 6, wherein only about 25 volume percent of said feedstock was or raw natural gas as it comes from a gas well, or gasoline extraction plant or refinery residue gas can be used. Further, hydrocarbons heavier than said gases can be used as charge, such as butane, pentane, or the like. Broadly, most any hydrocarbon can be used as feed in my process. However, the normally liquid hydrocarbons are preferred, and the normally liquid aromatic hydrocarbons are more preferred, because of the higher yields obtained therefrom. The feed can be injected as a liquid through a spray or atomizer, or the feed can be injected as a vapor. Hydrocarbons from other sources than petroleum likewise are suitable, as for example, low temperature coal gas, coal tar distillates, shale gases and distillates can be used.

These feedstocks may contain most any class of hydrocarbon compound, as for example, saturated or unsaturated hydrocarbons, paraffins, olefins, aromatics, naphthenes, or any others which might become available.

The BMCI correlation index referred to is a correlation index developed by the U.S. Bureau of Mines and is employed to denote aromaticity of an oil; a higher numerical index denoting a more aromatic oil. The index is calculated from the formula.

$$C.I. = \frac{48640}{K} + 473.7 \ G - 456.8$$

where:

C.I.=Bureau of Mines correlation index
K=Average boiling point (° K.)
G=Specific gravity at 60° F./60° F.

Oil absorption is measured by adding oil a few drops at a time to a one gram sample of carbon black on a mixing stone or glass plate. After each addition the oil is incorpated thoroughly with a spatula, using moderate pressure. Tiny pellets are formed, gradually increasing in size as more oil is added. The end point, approached one drop of oil at a time, is reached when a single ball of stiff paste is formed. The results are reported as cc. oil per gram of black, or converted to gallons of oil per 100 pounds of black.

The photelometer test is a measure of the tar content of the carbon black. Further details concerning said test can be found in U.S. Patent 3,009,784 to Krejci.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. In a process for the production of a furnace carbon black product wherein: a fuel and a free oxygen-containing gas are introduced into at least one first combustion zone which communicates with a second combustion zone through the periphery thereof, said second combustion zone being generally cylindrical and having a diameter greater than its length; said fuel is substantially completely burned in said first zone and the resulting combustion mixture is passed into said second zone to establish a mass of hot combustion gases therein; said combustion gases passing inwardly toward the longitudinal axis of said second zone and pass into an axially aligned third zone having a length greater than its diameter and a diameter less than the diameter of said second zone whereby said combustion gases enter said third zone; a normally liquid hydrocarbon feedstock stream is passed through said second zone along said axis thereof and axially into said third zone; said carbon black product is formed in said second and third zones by the decomposition of said feedstock; said carbon black product is recovered from the gaseous effluent from said third zone, the improvement comprising: introducing at least a portion of said feedstock into said first zone downstream from the point of introduction of said fuel and free oxygen-containing gas; directly contacting said thus introduced feedstock with said resulting combustion mixture and passing same along with said combustion mixture into said second zone and into admixture with said mass of hot combustion gases; and controlling the structure characteristics of said carbon black product by adjusting the amount of said thus introduced feedstock to be within the range of from 10 to 100 volume percent of the total amount of feedstock introduced into said process.

2. A process according to claim 1 wherein said carbon black product has higher structure characteristics than the carbon black normally produced from said feedstock and 100 volume percent of said feedstock is introduced into said first combustion zone.

3. A process according to claim 1 wherein: a pair of oppositely disposed first combustion zones is provided and each communicates with said second combustion zone at opposite areas on the periphery thereof; from 10 to 100 volume percent of said hydrocarbon feedstock is introduced into said pair of first combustion zones; and from 90 to 0 volume percent of said hydrocarbon feedstock is introduced axially into said second combustion zone.

4. A process according to claim 3 wherein: said carbon black product has higher structure characteristics than the carbon black normally produced from said feedstock and at least 30 volume percent of said hydrocarbon feedstock is introduced into said pair of first combustion zones; and not more than 70 volume percent of said hydrocarbon feedstock is introduced axially into said second combustion zone.

5. A process according to claim 4 wherein: 100 volume percent of said hydrocarbon feedstock is introduced into said pair of first combustion zones.

6. A process according to claim 5 wherein a minor portion of said hydrocarbon feedstock is introduced into one of said pair of first combustion zones and a major portion of said hydrocarbon feedstock is introduced into the other of said pair of first combustion zones.

7. A process according to claim 4 wherein: said fuel is a natural gas fuel; said free oxygen-containing gas is air and an excess of same is introduced along with said fuel into said first combustion zones; said resulting combustion mixture contains said excess air; and said hydrocarbon feedstock introduced into said first combustion zones is contacted directly in said first combustion zones with said resulting combustion mixture containing said excess air.

References Cited

UNITED STATES PATENTS

| | | | |
|---|---|---|---|
| 2,641,534 | 6/1953 | Krejci | 23—209.4 |
| 2,781,247 | 2/1957 | Krejci | 23—209.4 |
| 3,175,888 | 3/1965 | Krejci | 23—259.5 |
| 3,211,532 | 10/1965 | Henderson | 23—259.5 |

EDWARD J. MEROS, *Primary Examiner.*

U.S. Cl. X.R.

23—259.5